(12) United States Patent
Rajasekaran et al.

(10) Patent No.: US 9,300,591 B2
(45) Date of Patent: Mar. 29, 2016

(54) NETWORK DEVICE

(71) Applicant: Schweitzer Engineering Laboratories, Inc., Pullman, WA (US)

(72) Inventors: Manodev J. Rajasekaran, Pullman, WA (US); David M. Rector, Pullman, WA (US); Damian Sanchez Moreno, Moscow, ID (US); M. Wesley Kunzler, Moscow, ID (US); Srinivas Achanta, Pullman, WA (US); Jerry J. Bennett, Pullman, WA (US); Ian C. Ender, Bothell, WA (US)

(73) Assignee: SCHWEITZER ENGINEERING LABORATORIES, INC., Pullman, WA (US)

( * ) Notice: Subject to any disclaimer, the term of this patent is extended or adjusted under 35 U.S.C. 154(b) by 149 days.

(21) Appl. No.: 14/094,211

(22) Filed: Dec. 2, 2013

(65) Prior Publication Data

US 2014/0211624 A1 Jul. 31, 2014

Related U.S. Application Data

(60) Provisional application No. 61/757,303, filed on Jan. 28, 2013.

(51) Int. Cl.
| | | |
|---|---|---|
| *H04L 12/835* | (2013.01) | |
| *H04L 12/801* | (2013.01) | |
| *H04L 12/933* | (2013.01) | |

(52) U.S. Cl.
CPC .............. *H04L 47/30* (2013.01); *H04L 47/29* (2013.01); *H04L 49/10* (2013.01)

(58) Field of Classification Search
None
See application file for complete search history.

(56) References Cited

U.S. PATENT DOCUMENTS

| | | |
|---|---|---|
| 4,535,306 A | 8/1985 | Yamaguchi |
| 4,546,486 A | 10/1985 | Evans |

(Continued)

FOREIGN PATENT DOCUMENTS

| | | |
|---|---|---|
| GB | 2278519 | 11/1994 |
| JP | 10247377 | 9/1998 |

(Continued)

OTHER PUBLICATIONS

PCT/US2010/049169 Patent Cooperation Treaty Notification of Transmittal of the International Search Report and the Written Opinion, International Search Report, and Written Opinion, Nov. 5, 2010.

(Continued)

*Primary Examiner* — Benjamin H Elliott, IV
(74) *Attorney, Agent, or Firm* — Jared L. Cherry; Richard M. Edge (57) ABSTRACT

Disclosed is a network communication switch that facilitates reliable communication of high priority traffic over lower priority traffic across all ingress and egress ports. The network communication switch may monitor the frame storage buffer regardless of egress port, and when the frame storage buffer reaches a predetermined level, the switch may discard lower priority frames from the most congested port. When the frame storage buffer reaches a second predetermined level, the switch may discard lower priority frames before they are stored according to egress port. The network communication switch may further monitor ingress frames for priority, and assign priority to frames according to pre-assigned priority, ingress port, and/or frame contents.

23 Claims, 6 Drawing Sheets

(56) References Cited

U.S. PATENT DOCUMENTS

| | | | |
|---|---|---|---|
| 4,768,178 A | 8/1988 | Conklin | |
| 4,808,884 A | 2/1989 | Hull | |
| 5,103,466 A | 4/1992 | Bazes | |
| 5,235,590 A | 8/1993 | Taguchi | |
| 5,363,377 A | 11/1994 | Sharpe | |
| 5,596,263 A | 1/1997 | Zavis | |
| 5,734,654 A * | 3/1998 | Shirai et al. | 370/396 |
| 5,734,657 A | 3/1998 | Kim | |
| 5,793,869 A | 8/1998 | Claflin | |
| 6,456,831 B1 | 9/2002 | Tada | |
| 6,577,628 B1 | 6/2003 | Hejza | |
| 6,678,134 B2 | 1/2004 | Sugiura | |
| 6,704,316 B1 | 3/2004 | He | |
| 6,741,559 B1 * | 5/2004 | Smeulders et al. | 370/230 |
| 6,754,210 B1 | 6/2004 | Ofek | |
| 6,847,691 B2 | 1/2005 | Torikoshi | |
| 6,859,742 B2 | 2/2005 | Randall | |
| 6,891,441 B2 | 5/2005 | Rochow | |
| 6,937,683 B1 | 8/2005 | Ratzel | |
| 6,947,269 B2 | 9/2005 | Lee | |
| 7,239,581 B2 | 7/2007 | Delgado | |
| 7,272,201 B2 | 9/2007 | Whitehead | |
| 7,283,568 B2 | 10/2007 | Robie | |
| 7,463,467 B2 | 12/2008 | Lee | |
| 7,571,216 B1 | 8/2009 | Mcrae | |
| 7,617,408 B2 | 11/2009 | Frazier | |
| 7,701,683 B2 | 4/2010 | Morris | |
| 8,351,433 B2 | 1/2013 | Morris | |
| 8,867,345 B2 | 10/2014 | Morris | |
| 2001/0023464 A1 | 9/2001 | Deck | |
| 2002/0069299 A1 | 6/2002 | Rosener | |
| 2002/0080808 A1 | 6/2002 | Leung | |
| 2004/0196855 A1 | 10/2004 | Davies | |
| 2005/0141480 A1 * | 6/2005 | Jin | H04L 12/4625 370/351 |
| 2006/0041667 A1 * | 2/2006 | Ahn | H04L 12/5693 709/229 |
| 2007/0002746 A1 | 1/2007 | Shankar | |
| 2007/0127487 A1 | 6/2007 | Kim | |
| 2007/0147415 A1 | 6/2007 | Marusca | |
| 2008/0005484 A1 | 1/2008 | Joshi | |
| 2008/0071482 A1 | 3/2008 | Zweigle | |
| 2008/0189784 A1 | 8/2008 | Mangione-Smith | |
| 2008/0205303 A1 * | 8/2008 | Izumi | H04L 12/437 370/258 |
| 2008/0212469 A1 * | 9/2008 | Woehler et al. | 370/230 |
| 2008/0219186 A1 | 9/2008 | Bell | |
| 2008/0235355 A1 | 9/2008 | Spanier | |
| 2009/0141727 A1 | 6/2009 | Brown | |
| 2009/0160189 A1 | 6/2009 | Rasmussen | |
| 2009/0180477 A1 | 7/2009 | Akahane | |
| 2009/0207742 A1 * | 8/2009 | Suzuyama et al. | 370/249 |
| 2009/0213745 A1 * | 8/2009 | Yoshida | 370/252 |
| 2009/0260083 A1 | 10/2009 | Szeto | |
| 2009/0300165 A1 | 12/2009 | Tuckey | |
| 2010/0135312 A1 * | 6/2010 | Mitchem et al. | 370/412 |
| 2010/0195763 A1 | 8/2010 | Lee | |
| 2010/0251134 A1 | 9/2010 | Van Seggelen | |
| 2011/0022666 A1 | 1/2011 | Pinto | |
| 2011/0069709 A1 | 3/2011 | Morris | |
| 2011/0069718 A1 | 3/2011 | Morris | |
| 2011/0119761 A1 * | 5/2011 | Wang | H04L 63/1458 726/23 |
| 2012/0005326 A1 | 1/2012 | Bradetich | |
| 2012/0078555 A1 | 3/2012 | Banhegyesi | |
| 2013/0018521 A1 | 1/2013 | Manson | |
| 2013/0091582 A1 * | 4/2013 | Chen | G06Q 10/10 726/26 |
| 2013/0188642 A1 * | 7/2013 | Vallala et al. | 370/392 |
| 2014/0036999 A1 * | 2/2014 | Ryu | H04N 19/50 375/240.12 |
| 2014/0211324 A1 * | 7/2014 | Ishizaka | 359/708 |

FOREIGN PATENT DOCUMENTS

| | | |
|---|---|---|
| JP | 2001221871 | 8/2001 |
| JP | 2001221874 | 8/2001 |
| WO | 0057527 | 9/2000 |
| WO | 0016525 | 3/2001 |
| WO | 2005088911 | 9/2005 |

OTHER PUBLICATIONS

D.L. Mills, Experiments in Network Clock Synchronization, Network Working Group Request for Comments: 957, Sep. 1985.

D. Mills, Simple Network Time Protocol (SNTP) Version 4 for IPv4, IPv6, and OSI, Network Working Group Request for Comments: 4330, Jan. 2006.

PCT/US2014/016955 Patent Cooperation Treaty, International Search Report and Written Opinion of the International Searching Authority, Jun. 5, 2014.

Roy Moxley, Ken Fodero, and Hector J. Altuve, Updated Transmission Line Protection Communications, IEEE, Oct. 2008.

James W. Rice, Sam Fulford, and Nicholas C. Seeley, Improved Service Reliability for Rural Electric Customers—Innovative Auto-Restoration Following Loss of Primary Source Interconnection, Sep. 2006.

Nicholas C. Seeley, Automation at Protection Speeds: IEC 61850 GOOSE Messaging as a Reliable, High-Speed Alternative to Serial Communications, Feb. 2008.

S. Ward, W. Higinbotham, E. Duvelson, Inside the Cloud—Network Communications Basics for the Relay Engineer, 34th Annual Western Protective Relay Conference, Oct. 2007.

Daqing Hou, Dave Dolezilek, IEC 61850—What It Can and Cannot Offer to Traditional Protection Schemes, Sep. 2008.

PCT/US2011/039498 Patent Cooperation Treaty, International Search Report and Written Opinion of the International Searching Authority, Oct. 21, 2011.

W. Kleinebreg, ABB Switzerland Ltd., Hirschmann Automation & Control GmbH, IEC 61850 Modeling of Switches, Dec. 2009.

PCT/US2014/023169 Patent Cooperation Treaty, International Search Report and Written Opinion of the International Searching Authority, Aug. 19, 2014.

Cidon I., et al. Optimal buffer sharing. IEEE Journal on Selected Areas in Communications. vol. 13 No. 7, Sep. 1995.

Markaki M. E., et al. Proportional packet loss differentiation and buffer management for differentiated services in the Internet. Proceedings 25th Annual IEEE Conference on Local Computer Networks. IEEE, Nov. 2000.

* cited by examiner

NETWORK DEVICE

RELATED APPLICATION

The present application claims the benefit under 35 U.S.C. §119(e) of U.S. Provisional Patent Application No. 61/757,303, filed Jan. 28, 2013, and titled "Preserving High-Priority Ethernet Traffic During Congestion," which is incorporated herein by reference in its entirety.

TECHNICAL FIELD

This disclosure relates to systems and methods for managing communications using network devices. More particularly, but not exclusively, this disclosure relates to processing communication frames in a network device in such a way that more important messages are selectively preserved during periods of high network traffic or periods of network congestion.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special purpose processing devices such as an application specific integrated circuit (ASIC), Programmable Array Logic (PAL), programmable logic array (PLA), programmable logic device (PLD), field programmable gate array (FPGA), or any other customizable or programmable device.

Electric power generation and distribution systems are designed to generate, transmit, and distribute electric energy to loads. Electric power generation and distribution systems may include equipment, such as electric generators, electric motors, power transformers, power transmission and distribution lines, circuit breakers, switches, buses, transmission lines, voltage regulators, capacitor banks, and the like. Such equipment may be monitored, controlled, automated, and/or protected using intelligent electronic devices (IEDs) that receive electric power system information from the equipment, make decisions based on the information, and provide monitoring, control, protection, and/or automation outputs to the equipment.

In some embodiments, an IED may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communication processors, computing platforms, programmable logic controllers (PLCs), programmable automation controllers, input and output modules, governors, exciters, statcom controllers, static VAR compensator (SVC) controllers, on-load tap changer (OLTC) controllers, and the like. Further, in some embodiments, IEDs may be communicatively connected via a network that includes a variety of network equipment including, for example, multiplexers, routers, hubs, gateways, firewalls, and/or switches to facilitate communications on the networks, each of which may also function as an IED. Networking and communication devices may also be integrated into an IED and/or be in communication with an IED. As used herein, an IED may include a single discrete IED or a system of multiple IEDs operating together.

It should be understood that the present description is not limited to electric power distribution systems. The systems, apparatuses, and methods described herein may be applied to a broader range of communications systems. Indeed, the present description may be applied to communication devices in any communication system where certain messages should be delivered even in states of high communication network traffic loads. In addition to electric power distribution systems, the present disclosure may be applied to, for example, water distribution systems, natural gas distribution systems, control systems, non-control systems (computer networks, IT networks, and the like), and/or the like.

In certain embodiments one or more IEDs, monitored equipment, and/or network devices included in an electric power generation and distribution system may communicate using a variety of protocols, such as IEC 61850 GOOSE (Generic Object Oriented Substation Events). In further embodiments, one or more IEDs, monitored equipment, and/or network devices included in an electric power generation and distribution system may communicate using a Mirrored Bits® protocol, a Distributed Network Protocol (DNP), and or any other suitable communication protocol.

IEDs, monitored equipment, and/or network devices may communicate (e.g., transmit and/or receive) messages (e.g., GOOSE, Mirrored Bits®, and/or DNP messages) that include bits, bit pairs, measurement values, and/or any other relevant data elements. Certain communication protocols (e.g., GOOSE) may allow a message generated from a single device to be transmitted to multiple receiving devices (e.g., subscriber devices and/or particular receiving devices designated or identified in a message). Messages may include one or more control instructions, monitored system data, communications with other IEDs, monitored equipment and/or other network devices, and/or any other relevant communication, message, or data. In further embodiments, messages may provide an indication as to a state (e.g., a measured state) of one or more components and/or conditions within an electric power generation and distribution system.

Network devices may include a finite receiving buffer that may only store a predetermined number of messages, and thus may not be capable of storing certain messages if a significant number of messages are received in a relatively short period (e.g., during periods of high network message traffic). Similarly, a network switch may have a limited transfer rate that is lower than its receiving rate. For example, a network switch may have a 1 MB/second data transmission rate but a receiving rate that is substantially greater, thereby creating an asymmetry between inbound and outbound communication rates. If such a network switch includes a finite receiving and/or transmitting buffer and a substantial amount of data is received by such a network switch in a short period of time, the network switch may be unable to transmit received messages before the finite buffers become full and thus messages may be discarded or lost. In further circumstances, buffers may become full when insufficient resources are present to process network traffic at "wire speed."

The present disclosure includes a variety of systems and methods for managing data communication. According to various embodiments, the systems and methods disclosed herein may utilize certain criteria for processing data communications based on the available capacity of a storage buffer in a network device. In some embodiments, where utilization of the storage buffer exceeds a first threshold, criteria may be established for identifying one or more frames in the buffer to be discarded. The criteria may include, for example, a priority associated with a frame, a time of receipt of a frame, a port of receipt of a frame, and the like.

Figure 1:
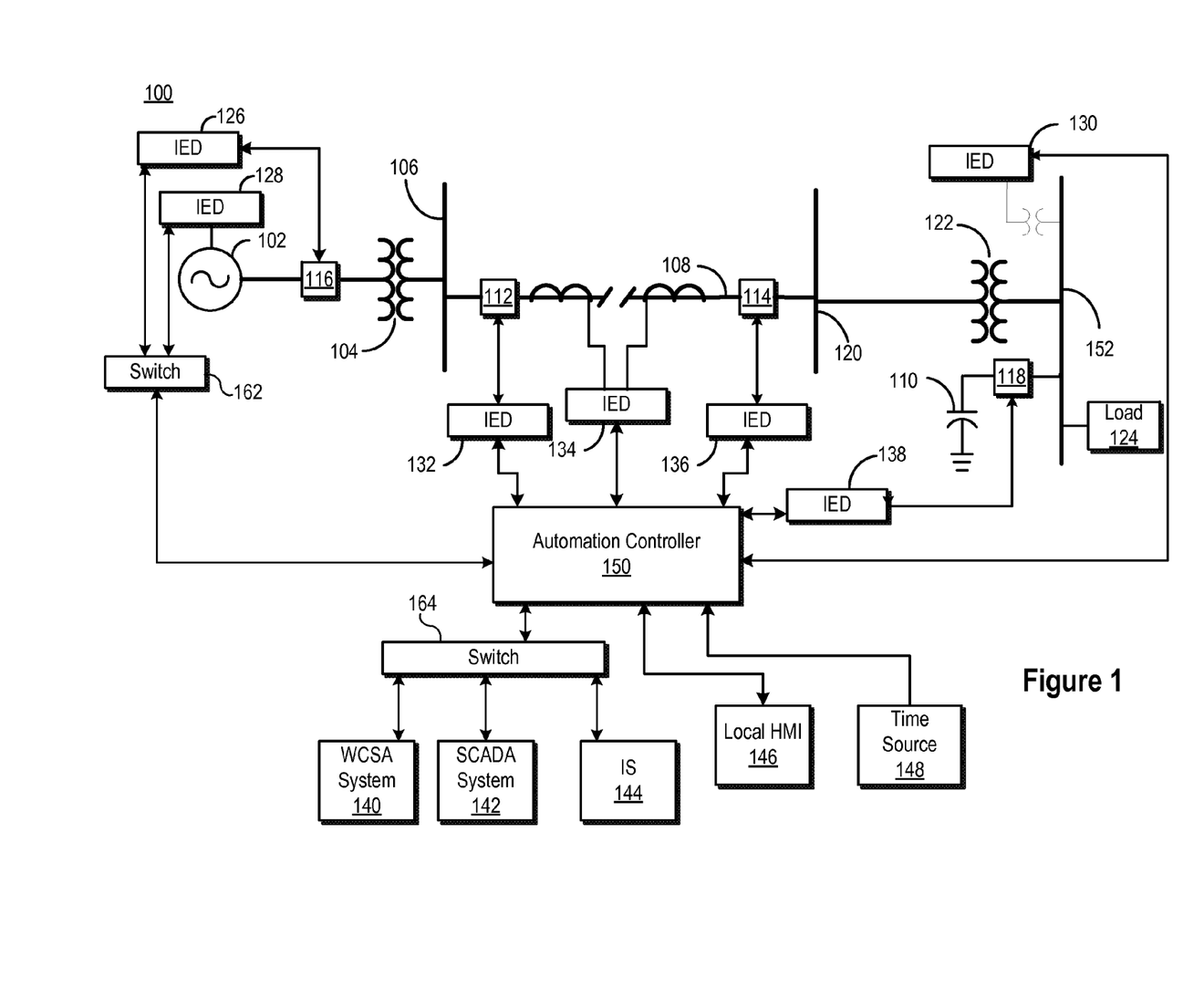
FIG. 1 illustrates a simplified diagram of an electric power generation and distribution system including various network devices consistent with certain embodiments disclosed herein.

FIG. 1 illustrates a simplified diagram of an electric power generation and distribution system 100 consistent with embodiments disclosed herein. The electric power generation and distribution system 100 may include, among other things, an electric generator 102, configured to generate an electric power output, which in some embodiments may be a sinusoidal waveform. Although illustrated as a one-line diagram for purposes of simplicity, the electric power generation and distribution system 100 may also be configured as a three-phase power system.

A step-up power transformer 104 may be configured to increase the output of the electric generator 102 to a higher voltage sinusoidal waveform. A bus 106 may distribute the higher voltage sinusoidal waveform to a transmission line 108 that in turn may connect to a bus 120. In certain embodiments, the system 100 may further include one or more breakers 112-118 that may be configured to be selectively actuated to reconfigure the electric power generation and distribution system 100. A step down power transformer 122 may be configured to transform the higher voltage sinusoidal waveform to lower voltage sinusoidal waveform that is suitable for distribution to a load 124.

The IEDs 126-138, illustrated in FIG. 1, may be configured to control, monitor, protect, and/or automate the one or more elements of the electric power generation and distribution system 100. An IED may be any processor-based device that monitors, controls, automates, and/or protects monitored equipment within an electric power generation and distribution system (e.g., system 100). In some embodiments, the IEDs 126-138 may gather status information from one or more pieces of monitored equipment (e.g., generator 102). Further, the IEDs 126-138 may receive information concerning monitored equipment using sensors, transducers, actuators, and the like. Although FIG. 1 illustrates one IED monitoring transmission line 108 (e.g., IED 134) and another IED controlling a breaker 114 (e.g., IED 136), these capabilities may be combined into a single IED.

FIG. 1 illustrates IEDs 126-138 performing various functions for illustrative purposes and does not imply any specific arrangements or functions required of any particular IED. In some embodiments, IEDs 126-138 may be configured to monitor and communicate information, such as voltages, currents, equipment status, temperature, frequency, pressure, density, infrared absorption, radio-frequency information, partial pressures, viscosity, speed, rotational velocity, mass, switch status, valve status, circuit breaker status, tap status, meter readings, and/or the like. Further, IEDs 126-138 may be configured to communicate calculations, such as phasors (which may or may not be synchronized as synchrophasors), events, fault distances, differentials, impedances, reactances, frequency, and the like. IEDs 126-138 may also communicate settings information, IED identification information, communications information, status information, alarm information, and/or the like. Information of the types listed above, or more generally, information about the status of monitored equipment, may be generally referred to herein as monitored system data.

In certain embodiments, IEDs 126-138 may issue control instructions to the monitored equipment in order to control various aspects relating to the monitored equipment. For example, an IED (e.g., IED 136) may be in communication with a circuit breaker (e.g., breaker 114), and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and be capable of instructing the voltage regulator to tap up and/or down. Information of the types listed above, or more generally, information or instructions directing an IED or other device to perform a certain action, may be generally referred to as control instructions.

IEDs 126-138 may be communicatively linked together using a data communications network, and may further be communicatively linked to a central monitoring system, such as a supervisory control and data acquisition (SCADA) system 142, an information system (IS) 144, and/or a wide area control and situational awareness (WCSA) system 140. In certain embodiments, various components of the electric power generation and distribution system 100 illustrated in FIG. 1 may be configured to generate, transmit, and/or receive messages (e.g. GOOSE messages), or communicate using any other suitable communication protocol.

The illustrated embodiments are configured in a star topology having an automation controller 150 at its center, however, other topologies are also contemplated. For example, the IEDs 126-138 may be communicatively coupled directly to the SCADA system 142 and/or the WCSA system 140. The data communications network of the system 100 may utilize a variety of network technologies, and may comprise network devices such as modems, routers, firewalls, virtual private network servers, and the like. Further, in some embodiments, the IEDs 126-138 and other network devices (e.g., one or more communication switches or the like) may be communicatively coupled to the communications network through a network communications interface.

Consistent with embodiments disclosed herein, IEDs 126-138 may be communicatively coupled with various points to the electric power generation and distribution system 100. For example, IED 134 may monitor conditions on transmission line 108. IEDs 126, 132, 136, and 138 may be configured to issue control instructions to associated breakers 112-118. IED 130 may monitor conditions on a bus 152. IED 128 may monitor and issue control instructions to the electric generator 102.

In certain embodiments, communication between and/or the operation of various IEDs 126-138 and/or higher level systems (e.g., SCADA system 142 or IS 144) may be facilitated by an automation controller 150. The automation controller 150 may also be referred to as a central IED or access controller.

The automation controller 150 may also include a local human machine interface (HMI) 146. In some embodiments, the local HMI 146 may be located at the same substation as automation controller 150. The local HMI 146 may be used to change settings, issue control instructions, retrieve an event report, retrieve data, and the like. The automation controller 150 may further include a programmable logic controller accessible using the local HMI 146.

The automation controller 150 may also be communicatively coupled to a time source (e.g., a clock) 148. In certain embodiments, the automation controller 150 may generate a time signal based on the time source 148 that may be distributed to communicatively coupled IEDs 126-138. Based on the time signal, various IEDs 126-138 may be configured to collect and/or calculate time-aligned data points including, for example, synchrophasors, and to implement control instructions in a time coordinated manner. In some embodiments, the WCSA system 140 may receive and process the time-aligned data, and may coordinate time synchronized control actions at the highest level of the electric power generation and distribution system 100. In other embodiments, the automation controller 150 may not receive a time signal, but a common time signal may be distributed to IEDs 126-138.

The time source 148 may also be used by the automation controller 150 for time stamping information and data. Time synchronization may be helpful for data organization, real-time decision-making, as well as post-event analysis. Time synchronization may further be applied to network communications. The time source 148 may be any time source that is an acceptable form of time synchronization, including, but not limited to, a voltage controlled temperature compensated crystal oscillator, Rubidium and Cesium oscillators with or without a digital phase locked loops, microelectromechanical systems (MEMS) technology, which transfers the resonant circuits from the electronic to the mechanical domains, or a global positioning system (GPS) receiver with time decoding. In the absence of a discrete time source 148, the automation controller 150 may serve as the time source 148 by distributing a time synchronization signal.

To maintain voltage and reactive power within certain limits for safe and reliable power distribution, an electric power generation and distribution system may include switched capacitor banks (SCBs) (e.g., capacitor 110), actuated by breaker 118 controlled by IED 138, configured to provide capacitive reactive power support and compensation in high and/or low voltage conditions within the electric power system.

Certain devices illustrated in FIG. 1 may communicate using one or more communication switches, such as switches 162 and 164. For example, IEDs 126 and 128 communicate with automation controller 150 via switch 162. Further, switch 164 may facilitate communications between automation controller and WCSA system 140, SCADA system 142, and IS 144. Switches 162 and 164 may embody the systems disclosed herein and/or may operate according to any of the methods disclosed herein. For example, during periods of high network traffic, switches 162 and 164 may be configured to monitor the flow of data and identify those data packets and/or frames having priority over other data packets and/or frames. Switches 162 and 164 may be configured to identify other data packets that may be selectively identified and discarded when switches 162 and 164 have difficulty handling received data during periods of high network message traffic. By selectively discarding data (as opposed to discarding data packets or frames based on time of receipt and buffer capacity), higher priority data may be more likely to be preserved and transmitted. Further, according to certain embodiments, in the event that a data stream includes only high priority data, and/or a buffer is full of high priority data, newer data may be preserved while older data may be discarded.

Figure 2:
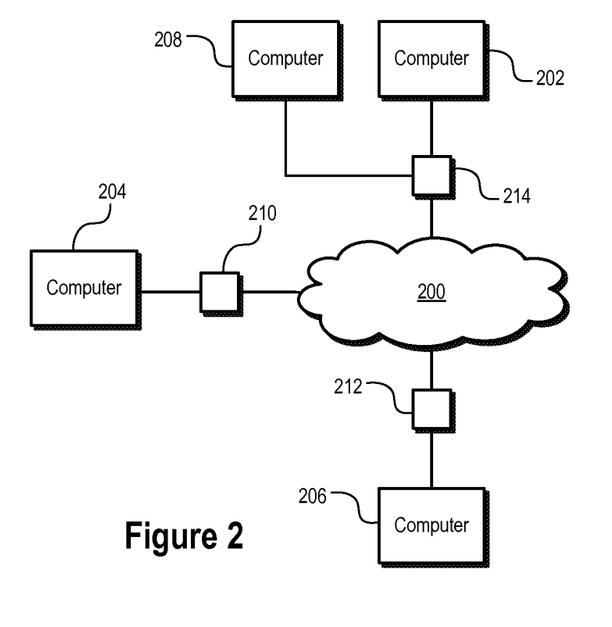
FIG. 2 illustrates a system of intelligent electronic devices communicatively coupled with a network via a plurality of network devices consistent with embodiments disclosed herein.

FIG. 2 illustrates computers 202-208 communicatively coupled with a network 200 via network switches 212-214 consistent with embodiments disclosed herein. Although the present disclosure may be implement in connection with an electric power distribution system (as illustrated described in connection with FIG. 1), the present disclosure may also be implemented in any type of data communication network. For example, the systems and methods disclosed herein may be implemented in data communication networks applicable to a wide variety of industries, technologies, and applications.

Computers 202-208 may be configured to communicate via a network 200 using messages formatted in a variety of data communication protocols. Network 200 may include a local area network or a wide area network. In some embodiments, network 200 may comprise a connection to the Internet. As discussed above, in certain circumstances, a receiving device (e.g., computer 202 and/or 208) may include a finite receiving buffer (e.g., a first-in-first out (FIFO) buffer) that may only store a predetermined number of messages, and thus may not be capable of storing certain messages if a significant number of messages are received in a relatively short period (e.g., during periods of high network message traffic). Similarly, a network switch may have a transfer rate that is lower than its receiving rate. For example, a network switch may have a 1 MB/second data transmission rate but a receiving rate that is substantially greater, thereby creating an asymmetry between inbound and outbound communication rates. If such a network switch includes a finite receiving and/or transmitting buffer and a substantial amount of data (e.g., a message stream) is received by such a network switch in a short period of time, the network switch may be unable to transmit received messages before the finite buffers become full and thus messages may be discarded or lost. In further circumstances, network devices and/or computers may have insufficient computing resources to process network traffic at "wire speed."

In a local area network (LAN), an Ethernet switch may be responsible for directing data frames between devices (e.g., computers 202-208 and switches 210-214). Under typical, "low-load" or "moderate-load" conditions, switches 210-214 may temporarily buffer the incoming data before sending it on to the destination device. However, certain network conditions may cause a "high-load" condition and network congestion. Such conditions may occur because the incoming data rate is higher than the outgoing rate for a given port. For example, if multiple devices send Ethernet frames to a single device, or one or more devices send many-cast (multicast or broadcast) packets destined for multiple other devices, or if a high speed device sends data to a lower speed device, a "high-load" condition may occur.

Switches may employ various strategies for dealing with congestion. One such strategy may be suited for addressing a limited congestion time period (also known as "bursty" congestion), during which the switch may use internal frame storage buffers to store pending frames, queue the frame pointers in an egress priority queue, and then send the frames out in a FIFO fashion. Such buffers can introduce undesired latency in the data stream. Increasing the size of a buffer may result in longer delays. Thus, buffers may be sized to keep latency low. In other words, according to certain embodiments, a relatively small buffer may be used to keep latency within desired parameters.

In certain embodiments, frame storage buffers may be shared across ports to reduce the cost, complexity, and latency of switches. In embodiment in which a storage buffer is shared across multiple ports, congestion on one or more ports may adversely affect communication among other uncongested ports. In order to address this issue, certain embodiments consistent with the present disclosure may identify a specific port experiencing congestion and may process traffic originating from the congested port in order to mitigate adverse effects on other ports, and particularly to mitigate the impact of communication of high priority data received on other ports.

In the situation where a period of congestion lasts longer than may be accommodated using a buffer, data must be discarded. Various embodiments consistent with the present disclosure pertain to systems and methods for determining which data packets to discard and which data packets to retain. Switches typically lack sufficient processing power to inspect the content of every frame or packet. Thus, the decision of which frame to discard may be made arbitrarily, and may be associated with those ports with the highest incoming (ingressing) or outgoing (egressing) frame rate. Several different Random Early Detection (RED) mechanisms may be used to monitor the buffers, and begin randomly discarding frames based on various factors, such as port-to-port communication data rates, to pre-empt full buffer conditions. If VLAN tags are used, then the frames may have a priority attribute, which may be used to preferentially discard lower priority frames egressing a particular port. Where frame buffers are shared across ports, a port with low priority frames may utilize buffer space to the exclusion of higher priority frames egressing another port. Accordingly, certain embodiments of the present disclosure may use techniques that selectively removes lower priority data from a buffer and/or selectively discards lower priority data on ingress.

Discarded frames are an important feature that may signify congestion is present in a network environment. In response, network devices may reduce their data rate accordingly. Ethernet frame discard mechanisms may not preserve high priority frames across different ports during congestion periods. Preservation of high priority frames may raise concerns in a variety of applications. For example, delay in the transmission or the loss of high priority data in a control system for an electric power distribution system may be a serious concern. Further, in audio and video communication applications, loss of data and/or increased latency may disrupt the quality of the media. Accordingly, various embodiments consistent with the present disclosure may prioritize high priority data over lower priority data, thus increasing the likelihood of successful transmission of high priority data with low latency.

Figure 3A:
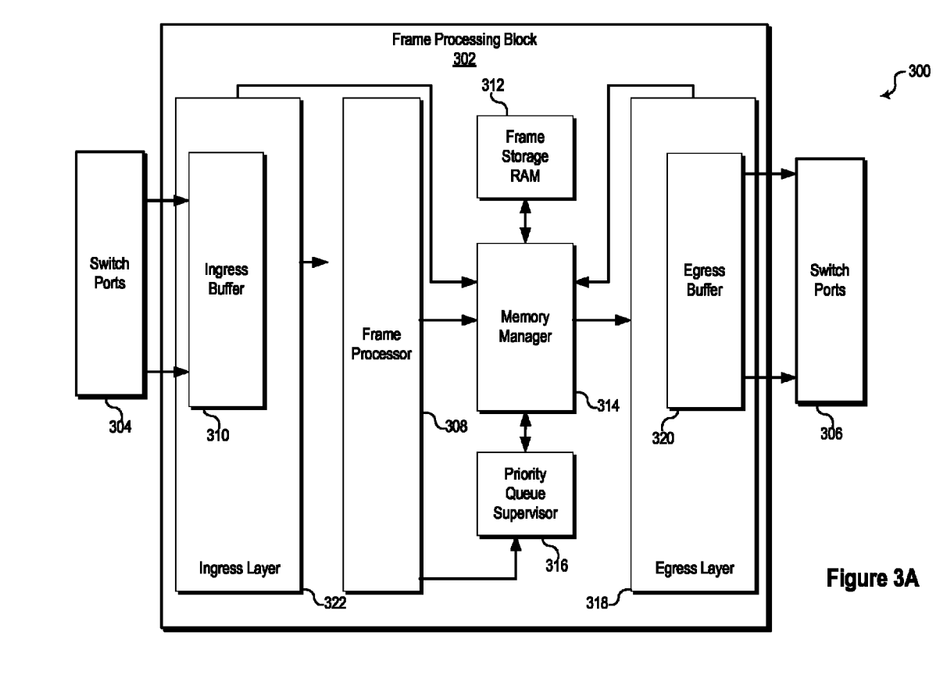
FIG. 3A illustrates a functional block diagram of a network device architecture consistent with embodiments disclosed herein.

FIG. 3A illustrates a functional block diagram of a network device 300 with an architecture consistent with embodiments disclosed herein. The network device 300 includes a plurality of ingress network ports 304. The network ports 304 may be in communication with a frame processing block 302. The frame processing block 302 may include several functional blocks for processing the frames. Such functional blocks may include, for example, an ingress layer 322, a frame processor 308, a memory manager 314, frame storage RAM 312, a priority queue supervisor 316, an egress layer 318, and an egress buffer 320.

Storage RAM 312 may be configured to temporarily buffer data frames transmitted by network device 300. According to some embodiments, the frames may be stored in a single buffer, while in other embodiments, a frame storage RAM 312 may store the frames in separate logical buffers. Each of the separate logical buffers may correspond with a separate egress port. Each of the separate logical buffers may organize frames by priority. The entire frame storage RAM 312 may be monitored for congestion. Metadata (or buffer descriptors) may also be stored in a single buffer or multiple logical buffers that correspond with separate output ports.

The specific configuration illustrated in FIG. 3A is merely provided as an example of one possible configuration. The frame processing block 302 may export frames from the egress layer to egress switch ports 306. According to other embodiments, one or more of the illustrated elements may be omitted and/or combined with other elements.

Memory manager 314 may operate in conjunction with the frame storage RAM and the priority queue supervisor to manage the flow of network data traffic through network device 300. Memory manager 314 may implement certain functions and/or methods described herein for management of frames stored in frame storage RAM 312 in order to minimize latency and maximize the reliable transmission of high priority data. Further, priority queue supervisor 316 may monitor the priority information relating to data received by network device 300 and frames stored in frame storage RAM 312. According to one specific embodiment, priority queue supervisor 316, memory manager 314, and frame storage RAM 312 may be operable to implement the method for managing network packets illustrated in FIG. 4, and which is described in greater detail below.

Figure 3B:
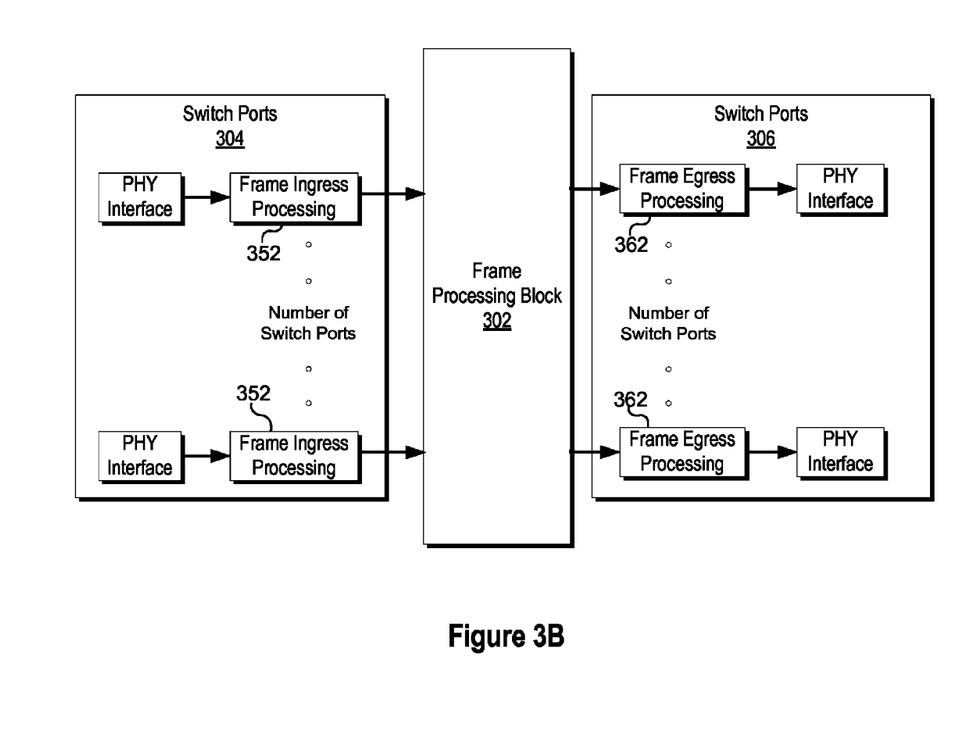
FIG. 3B illustrates a functional block diagram of a plurality of network port components associated with the network device illustrated in FIG. 3A consistent with embodiments disclosed herein.

FIG. 3B illustrates a functional block diagram of a plurality of network port components associated with the network device illustrated in FIG. 3A consistent with embodiments disclosed herein. Each of the plurality of network ports may include a physical interface, frame ingress processing 352, and a buffer 354. Each of the egress switch ports 306 may include, for example, frame egress processing 362 and physical interfaces. Statistic gathering may be performed using information from the ingress network ports 304 and the egress network ports 306. In one embodiment, such statics may include, a count of how many frames have gone through each port (ingress and egress), the number of bytes in each frame, if there were any errors detected in the frame, etc. This statistical information may be used to track the performance of the network device and/or to diagnose any problems associated with the device. In another embodiment, collected statistics may include remote network monitoring (RMON), RMON2, SMON, and IEEE Ethernet Statistics, as set forth in IEEE Standard 802.3, Section 1, Chapter 5.

Figure 3C:
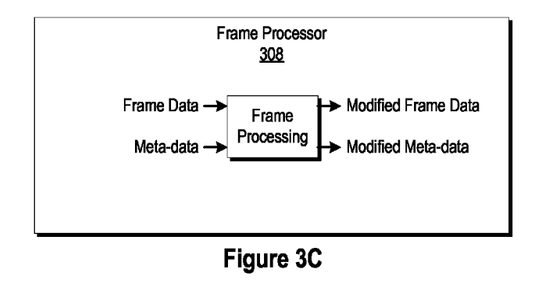
FIG. 3C illustrates a function block diagram of a frame processing component associated with the network device illustrated in FIG. 3A consistent with embodiments disclosed herein.

FIG. 3C illustrates a function block diagram of a frame processor 308, as illustrated in FIG. 3A and consistent with embodiments disclosed herein. Frame processor 308 may include one or more functional elements that use frame data and metadata (or "buffer descriptor") to produce modified frame data and/or modified metadata. In some instances, the frame data and/or metadata from certain of the blocks is not modified.

In one particular embodiment, a frame that does not include a VLAN priority tag may be assigned a priority tag and the priority tag may be included in the modified frame data. That is, if a frame is received by network device 300 that does not include a VLAN tag, network device 300 may add a VLAN tag and assign a priority. In some embodiments, a priority may be based on the ingress port. Thus, if a particular port is associated with a high priority device, then network device 300 may assign a high priority to the frame received from the high priority device. In other alternatives, the frame may be assigned a higher priority depending on its contents, such as including a protection communication, its corresponding with a particular protocol, or the like.

According to some embodiments, frame processor 308 may be implemented using an application specific integrated circuit, programmable logic array, a programmable logic device, a field programmable gate array (FPGA), or any other customizable or programmable device. Frame processor 308 may operate using any number of processing rates and architectures and may be configured to perform various algorithms, calculations, and/or methods described herein. Frame processor 308 may further perform logical and arithmetic operations based on program code accessible to frame processor 308.

In certain embodiments implemented using an FPGA or other configurable device, arbitrary frame inspection may be implement by network device 300. If any frame is identified by the inspection block as critical or non-critical, then the frame can be tagged with high and low priorities respectively. Accordingly, network device 300 may be able to preserve critical frames based on the content of the frame, regardless of ingress port, or VLAN tag. For example, if the frame contains a high priority GOOSE message, the inspection component may be configured identify the message based on values at key byte locations in the frame, and then raise the priority of the frame by insertion or modification of an appropriate VLAN tag. With specific inspection criteria, this method provides a means for the switch to selectively identify frame priority based on the type of information in the frame.

Figure 3D:
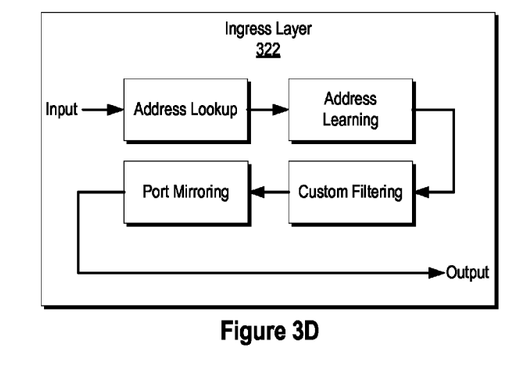
FIG. 3D illustrates a functional block diagram of an ingress layer component associated with the network device illustrated in FIG. 3A consistent with embodiments disclosed herein.

FIG. 3D illustrates a functional block diagram of an ingress layer 322 associated with the network device illustrated in FIG. 3A and consistent with embodiments disclosed herein. Ingress buffer 310 may receive an input (such as an input from an ingress arbiter), that leads to an address lookup block. The address lookup block may allow a network device to determine a destination of each frame. The address lookup block may determine a destination of each frame by tracking all frames it receives, and storing the ingress information of each frame with the frame's MAC address. The next time a frame with a destination MAC address corresponding to a MAC address stored in the address lookup block, the network device may determine on which port the frame should egress to reach its destination. Information from the address lookup block may be communicated to an address learning block, continue to a custom filtering block, and may pass information to a port mirroring block. Finally, the information may be sent to an output (such as an output to other frame processing 308).

Some switches may be configured to consider priority within a particular port's egress FIFO queue. Such a configuration permits a switch to prioritize the egress of higher priority frames over low priority frames for a given port. However, lower priority frames on ingress may fill the frame storage buffer, and thus may effectively blocking higher priority frames of other ports.

In various embodiments of the present disclosure, a switch may use VLAN priority information to select the lowest priority frames to discard, regardless of egress port. This may be accomplished by scanning the pending frames across all ports. VLAN priority information can be included in the frame as the frame is received by the switch. In one embodiment the number of frames in the frame storage buffer may be monitored relative to the capacity of the buffer. The used volume of the buffer may be compared to various thresholds, and the network device 300 may implement varying strategies based on which, if any, of the thresholds are met or exceeded. In one embodiment, if the buffer becomes full to a first predetermined level or threshold, the priority queue supervisor (illustrated in FIG. 3A) may select the lowest priority frame of the most congested port to begin discarding frames before they egress. The priority queue supervisor may also have an option to preserve high priority frames regardless of egress port congestion level. In one alternative, high priority frames may not be discarded until all of the low priority frames stored in frame storage RAM (illustrated in FIG. 3A) have been discarded. In this manner, high priority frames will not be discarded until all low priority frames from all ports are removed.

In some protocols such as Broadcast or Multicast GOOSE, a certain communication may be intended for more than one consuming device. In such protocols, since many high priority frames could be destined for more than one IED, simply removing low priority frame pointers from the most congested port may not be successful in clearing space in the frame storage buffer. This is because a many-cast frame pointer gets written to more than one egress priority queue.

If the frame storage buffer becomes full to a second predetermined level or threshold, network device may identify low priority frames and discard such frames before they enter the egress queues. To prevent TCP Synchronization, in which all senders may decrease their transmit rate simultaneously, frames may be discarded on ingress in a progressive manner, increasing the discard rate depending upon the room remaining for new frames in the frame storage buffer.

According to one embodiment, congestion may be monitored by assigning a weight to each frame according to its priority, and calculating a sum of the weights of the frames. For example, frame processor 308 may assign a weight of "1" to each frame of the highest priority (Priority 3), "2" to each frame of the next highest priority (Priority 2), "4" to each frame of the third highest priority (Priority 1) and "8" to each frame of the lowest priority (Priority 0). In this way the congestion of each port may be calculated. Thus, even if each egress port holds the maximum number of frames that it can hold, the "most congested" port may be determined by the assigned weights of each frame therein.

For example, for a switch with four ports, where the frame buffers of each of the four ports can hold five frames, each of the buffers for each of the ports may be full. However, the buffer corresponding to port 1 may hold five frames of Priority 3 (giving it a weighted level of five); the buffer corresponding to port 2 may hold two frames of Priority 3, one frame of Priority 2, one frame of Priority 1, and one frame of Priority 0 giving it a weighted level of 16; the buffer corresponding to port 3 may hold two frames of Priority 3, one frame of Priority 2, and two frames of Priority 0 giving it a weighted level of 20; and, the buffer corresponding to port 4 may hold two frames of Priority 3, and three frames of Priority 0, giving it a weighted level of 26. Thus, the buffer corresponding with port four is the most congested, and the lowest priority frame therein would be the first to be discarded. In one embodiment, the processor may then recalculate the congestion level and the weighted levels of each buffer before discarding additional frames.

In one embodiment, high priority frames are preserved regardless of ingress or egress frame discarding so that critical data is not lost. Again, this step preserves high priority frames, regardless of port, with the consequence that low priority traffic between two ports unrelated to congestion could be affected (head of line blocking).

In some switch designs, a large volume of high priority traffic between a few ports, with low priority traffic between other ports may result in the low priority traffic being blocked (also known as "head of line blocking"), resulting in effectively allowing congestion between two independent ports to affect traffic between two other unrelated ports. For example, if there are two VLANs configured in the Ethernet switch, traffic on one VLAN should be unnoticeable on the other VLAN.

However, given the limited frame buffer space, during congestion in the protection environment, the higher priority traffic may be given priority, regardless the effect on ports associated with lower priority data. Certain embodiments consistent with the present disclosure may, therefore, be more likely to pass high priority traffic. According to such embodiments, a Denial of Service (DoS) attack may therefore have little or no effect on transmission of high priority traffic. However, if all traffic on the switch consists of the highest priority traffic and the switch experiences congestion, then the switch may still discard high priority frames.

It should be understood that the embodiments herein described may be used separately or in conjunction with each other, and even in conjunction with other alternative embodiments for resolving congestion in network switches. For example, in one embodiment a network communications switch may discard by priority on egress as described above, in addition to discarding by priority on ingress.

Figure 4:
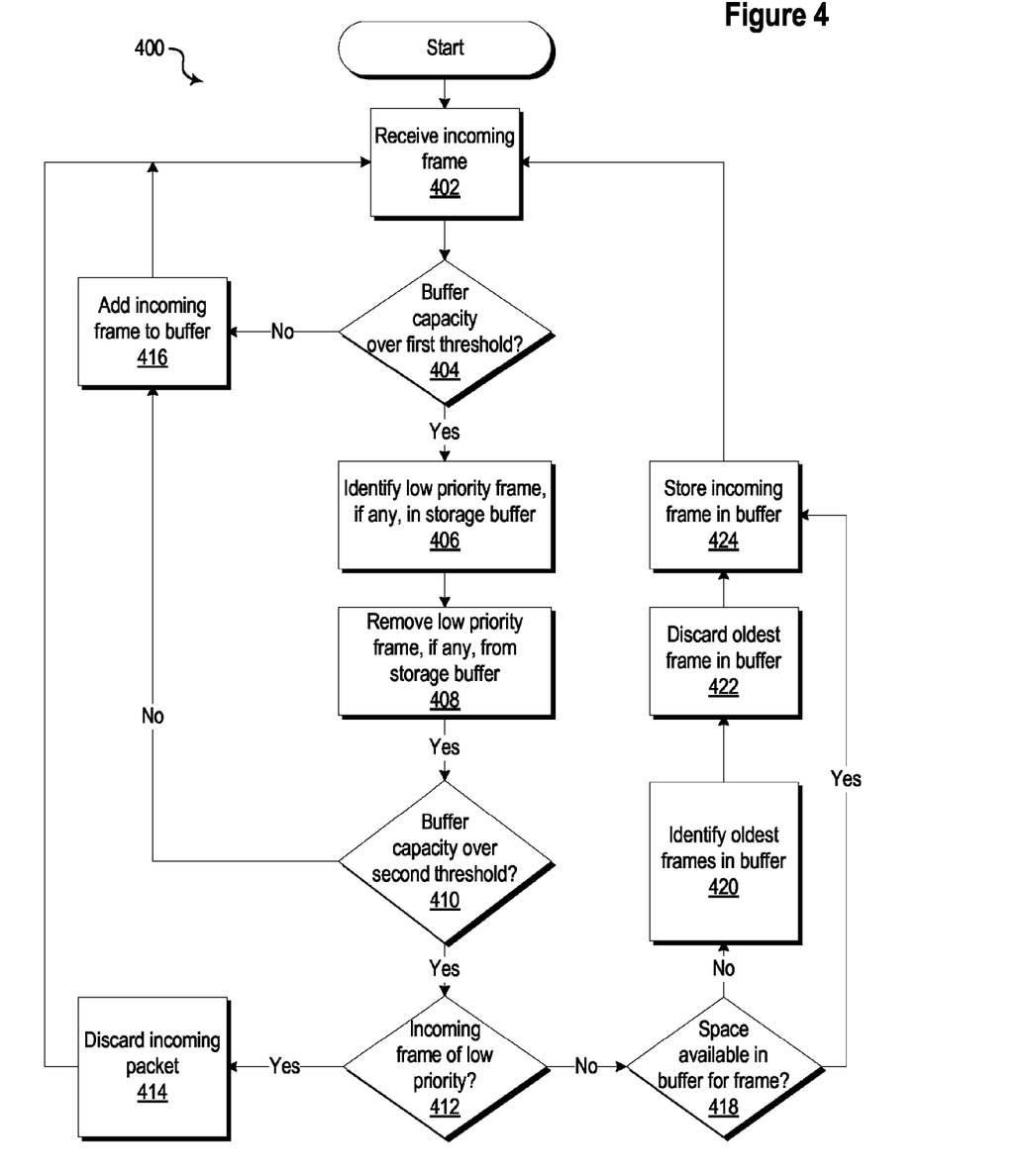
FIG. 4 illustrates a flow chart of a method for managing network packets in a network device consistent with embodiments disclosed herein.

FIG. 4 illustrates a flow chart of a method 400 for managing network packets in a network device consistent with embodiments disclosed herein. At 402, a data frame may be received by a network device. At 404, method 400 may determine whether a buffer capacity exceeds a first threshold. If the buffer capacity is under the first threshold, at 416, the incoming frame may be added to the buffer. If the buffer capacity is not over the first threshold, at 406, a low priority frame may be identified. Priority of a frame may be determined in a variety of ways. In one embodiment, the priority may be determined by a VLAN tag. An identified low priority frame may be removed from the storage buffer at 408.

At 410, it may be determined whether the buffer capacity exceeds a second threshold. If not, the incoming frame may be added to the buffer at 416. If the buffer capacity is over the second threshold, at 412, the priority of the incoming frame may be determined. If the frame is a low priority frame, the incoming frame may be discarded at 414. If the frame is not a low priority frame, at 418, it may be determined whether the buffer has space available for storing the frame. If so, the frame may be stored at 424.

At 418, all low priority frames have been removed from the storage buffer as a result of 406 and 408. Accordingly, only higher priority data is stored in the buffer. As a result, method 400 may identify the oldest frame in the buffer at 420 and may discard the oldest frame in the buffer at 422. Discarding the oldest frame thus makes space available for the incoming frame, which may be stored at 424.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A network communication device, comprising:
a plurality of network ports configured to receive and transmit data frames;
a frame storage buffer;
a processor in communication with the plurality of network ports and the frame storage buffer; and
a non-transitory computer-readable storage medium storing executable instructions that, when executed by the processor, cause the processor, in response to receipt of a first ingress frame via one of the plurality of network ports, to:
determine whether the first ingress frame corresponds with a particular protocol;
when the first ingress frame corresponds with the particular protocol, assign a priority weight to the first ingress frame;
monitor the frame storage buffer to determine a used volume of the frame storage buffer;
determine that the used volume exceeds a first threshold;
when the frame storage buffer includes a low-priority weight frame, identify the low priority weight frame stored in the frame storage buffer that satisfies a criteria;
discard the identified frame;
compare the used volume to a second threshold;
determine that the used volume is below the second threshold;
store the first ingress frame in the frame storage buffer; and
route the first ingress frame and transmit the first ingress frame via the network ports to an address associated with the first ingress frame.

2. The network communication device of claim 1, wherein the frame storage buffer comprises an egress buffer and the identified frame is stored in the egress buffer.

3. The network communication device of claim 1, wherein when the frame storage buffer does not include a low-priority weight frame and the used volume is not below the second threshold, discard an oldest frame in the frame storage buffer.

4. The network communication device of claim 1, wherein the criteria associated with the identified frame comprises an identification of a specified ingress port.

5. The network communication device of claim 4, wherein the specified ingress port comprises a most congested network port.

6. The network communication device of claim 5, wherein the most congested network port is determined based on a sum of priority weight designations associated with each of the plurality of network ports.

7. The network communication device of claim 1, wherein the criteria associated with the identified frame comprises an indication of the time of receipt.

8. The network communication device of claim 1, wherein the instructions further cause the processor to:
determine a priority associated with the first ingress frame; and
modify the first ingress frame to include a priority designation.

9. The network communication device of claim 8, wherein the priority designation is based on one of the network port that received the first ingress frame, a protocol according to which the first ingress frame is formatted, and content associated with the first ingress frame.

10. The network communication device of claim 1, wherein the instructions further cause the processor, in response to receipt of a second ingress frame, to:
determine that the second ingress frame has a low priority; and
discard the second ingress frame prior to storage of the second ingress frame in the frame storage buffer.

11. The network communication device of claim 1, wherein the instructions further cause the processor, in response to receipt of a second ingress frame, to:
determine that the second ingress frame has a high priority;
identify an oldest frame in the frame storage buffer;
discard the oldest frame in the frame storage buffer; and
store the second ingress frame in the frame storage buffer.

12. A method of managing communication in a data network using a network communication device, the method comprising:
receiving a first ingress frame;
monitoring a frame storage buffer associated with the network communication device to determine a used volume of the frame storage buffer;
assigning a priority weight to the first ingress frame based on whether the first ingress frame corresponds with a particular protocol;
determining that the used volume exceeds a first threshold;
when the frame storage buffer includes a low-priority weight frame, identifying the low-priority weight frame stored in the frame storage buffer that satisfies a criteria;
discarding the identified frame;
comparing the used volume to a second threshold;
determining that the used volume is below the second threshold;
storing the first ingress frame in the frame storage buffer; and routing the first ingress frame and transmitting the first ingress frame via the network ports to an address associated with the first ingress frame.

13. The method of claim 12, wherein when the frame storage buffer does not include a low-priority weight frame and the used volume is not below the second threshold, discard an oldest frame in the frame storage buffer.

14. The method of claim 12, wherein the criteria associated with the identified frame comprises an identification of a specified ingress port.

15. The method of claim 14, wherein the specified ingress port comprises a most congested port.

16. The method of claim 15, further comprising determining a most congested network port by summing a plurality of priority designations associated with each of the plurality of network ports.

17. The method of claim 12, wherein the criteria associated with the identified frame comprises an indication of the time of receipt.

18. The method of claim 12, further comprising:
determining a priority associated with the first ingress frame; and
modifying the first ingress frame to include a priority designation.

19. The method of claim 12, further comprising:
receiving a second ingress frame;
determining that the second ingress frame has a low priority; and
discarding the second ingress frame prior to storing the second ingress frame in the frame storage buffer.

20. The method of claim 12, further comprising:
receiving a second ingress frame;
determining that the second ingress frame has a high priority;
identifying an oldest frame in the frame storage buffer;
discarding the oldest frame in the frame storage buffer;
storing the second ingress frame in the frame storage buffer.

21. A network communication device, comprising:
- a plurality of network ports configured to receive and transmit data frames;
- a frame storage buffer;
- a processor in communication with the plurality of network ports and the frame storage buffer; and
- a non-transitory computer-readable storage medium storing executable instructions that, when executed by the processor, cause the processor, in response to receipt of a first ingress frame via one of the plurality of network ports, to:
  - monitor the frame storage buffer to determine a used volume of the frame storage buffer;
  - determine that the used volume exceeds a first threshold;
  - associate priority designations with contents of each of a plurality of network ports;
  - determine a most congested egress port based on a sum of the priority designations for each of the plurality of network ports;
  - identify a frame stored in the most congested egress port that satisfies a criteria;
  - discard the identified frame;
  - compare the used volume to a second threshold;
  - determine that the used volume is below the second threshold;
  - store the first ingress frame in the frame storage buffer; and
  - route the first ingress frame and transmit the first ingress frame via the network ports to an address associated with the first ingress frame.

22. A network communication device, comprising:
- a plurality of network ports configured to receive and transmit data frames;
- a frame storage buffer;
- a processor in communication with the plurality of network ports and the frame storage buffer; and
- a non-transitory computer-readable storage medium storing executable instructions that, when executed by the processor, cause the processor, in response to receipt of a first ingress frame via one of the plurality of network ports, to:
  - determine whether an ingress frame includes a protection communication related to protection of electric power system equipment;
  - when the ingress frame includes the protection communication, assign a priority to the first ingress frame;
  - monitor the frame storage buffer to determine a used volume of the frame storage buffer;
  - determine that the used volume exceeds a first threshold;
  - identify a frame stored in the frame storage buffer that satisfies a criteria;
  - discard the identified frame;
  - compare the used volume to a second threshold;
  - determine that the used volume is below the second threshold;
  - store the first ingress frame in the frame storage buffer; and
  - route the first ingress frame and transmit the first ingress frame via the network ports to an address associated with the first ingress frame.

23. A network communication device, comprising:
- a plurality of network ports configured to receive and transmit data frames;
- a frame storage buffer;
- a processor in communication with the plurality of network ports and the frame storage buffer; and
- a non-transitory computer-readable storage medium storing executable instructions that, when executed by the processor, cause the processor, in response to receipt of a first ingress frame via one of the plurality of network ports, to:
  - monitor the frame storage buffer to determine a used volume of the frame storage buffer;
  - determine that the used volume exceeds a first threshold;
  - identify a frame stored in the frame storage buffer that includes a particular VLAN priority tag;
  - discard the identified frame;
  - compare the used volume to a second threshold;
  - determine that the used volume is below the second threshold;
  - store the first ingress frame in the frame storage buffer; and
  - route the first ingress frame and transmit the first ingress frame via the network ports to an address associated with the first ingress frame.

* * * * *